United States Patent
Najmabadi et al.

(10) Patent No.: US 6,915,989 B2
(45) Date of Patent: Jul. 12, 2005

(54) AIRCRAFT MULTI-AXIS MODAL SUPPRESSION SYSTEM

(75) Inventors: Kioumars Najmabadi, Bellevue, WA (US); Chuong B. Tran, Mukilteo, WA (US); John Koon-Hung Ho, Shoreline, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/136,907

(22) Filed: May 1, 2002

(65) Prior Publication Data

US 2003/0205644 A1 Nov. 6, 2003

(51) Int. Cl.[7] .............................................. B64C 13/16
(52) U.S. Cl. ..................... 244/195; 244/177; 244/75 R
(58) Field of Search ............................... 244/195, 75 A, 244/177, 194, 87, 89, 45 A

(56) References Cited

U.S. PATENT DOCUMENTS

| | | | |
|---|---|---|---|
| 3,241,077 A | | 3/1966 | Smyth et al. |
| 3,347,498 A | * | 10/1967 | Priestley et al. ............ 244/191 |
| 3,374,966 A | | 3/1968 | Howard |
| 3,734,432 A | | 5/1973 | Low |

(Continued)

FOREIGN PATENT DOCUMENTS

| | | |
|---|---|---|
| EP | 0 293 018 A | 11/1988 |
| EP | 0 497 660 A1 | 1/1992 |
| EP | 0 742 142 A2 | 11/1996 |
| EP | 0 743 243 A1 | 11/1996 |
| EP | 1 016 589 B1 | 9/2003 |
| JP | 07309298 | 11/1995 |

OTHER PUBLICATIONS

European Search Report for European Application No. EP 03 07 8445, May 14, 2004, (6 pgs).

*Primary Examiner*—Michael J. Carone
*Assistant Examiner*—Gabriel Sukman
(74) *Attorney, Agent, or Firm*—Perkins Coie LLP

(57) ABSTRACT

Vibrations due to excitation of the natural modes of an aircraft's body are suppressed by an active multi-axis modal suppression system. Dedicated sensors are positioned in the aircraft at optimal locations for sensing modal induced vibrations. The sensor produced signals are processed through control logic which, in response thereto, and in response to aircraft inertial, velocity and altitude related signals produces output control signals. The control signals effect control surface deployment creating forces to suppress the natural mode induced vibrations on multiple geometric axis's. More particularly, symmetric and anti-symmetric control surface deployments are used on one or more geometric axis's to damp lateral, longitudinal, vertical and most importantly torsional vibrational modes.

11 Claims, 12 Drawing Sheets

Sensor Locations of preferred embodiment of the present invention

U.S. PATENT DOCUMENTS

| | | | |
|---|---|---|---|
| 3,902,686 A | | 9/1975 | Wykes et al. |
| 4,455,004 A | | 6/1984 | Whitaker |
| 4,479,620 A | | 10/1984 | Rogers et al. |
| 4,562,546 A | * | 12/1985 | Wykes et al. .................. 701/4 |
| 4,598,888 A | * | 7/1986 | Beteille .................... 244/76 R |
| 4,706,902 A | * | 11/1987 | Destuynder et al. ...... 244/76 C |
| 4,796,192 A | | 1/1989 | Lewis |
| 4,821,981 A | | 4/1989 | Gangasaas et al. |
| 5,072,893 A | * | 12/1991 | Chakravarty et al. ..... 244/76 R |
| 5,082,207 A | * | 1/1992 | Tulinius .................... 244/76 R |
| 5,135,186 A | * | 8/1992 | Ako ......................... 244/75 A |
| 5,186,416 A | | 2/1993 | Fabre et al. |
| 5,224,667 A | | 7/1993 | Lacabanne |
| 5,375,794 A | * | 12/1994 | Bleeg ...................... 244/76 C |
| 5,452,865 A | | 9/1995 | Tran et al. |
| 5,549,260 A | | 8/1996 | Reed |
| 5,598,991 A | | 2/1997 | Nadkarni et al. |
| 5,657,949 A | | 8/1997 | Deck et al. |
| 5,667,166 A | * | 9/1997 | Tran et al. ................ 244/76 C |
| 5,669,582 A | * | 9/1997 | Bryant et al. ............. 244/76 C |
| 5,833,173 A | * | 11/1998 | Tran et al. ................ 244/75 A |
| 5,860,625 A | | 1/1999 | Tran et al. |
| 5,908,176 A | * | 6/1999 | Gilyard ...................... 244/203 |
| 6,064,923 A | | 5/2000 | Bilange et al. |
| 6,161,801 A | | 12/2000 | Kelm |
| 6,168,117 B1 | * | 1/2001 | Shinagawa .................. 244/195 |
| 6,189,830 B1 | | 2/2001 | Schnelz et al. |
| 6,416,017 B1 | * | 7/2002 | Becker ..................... 244/76 C |

\* cited by examiner

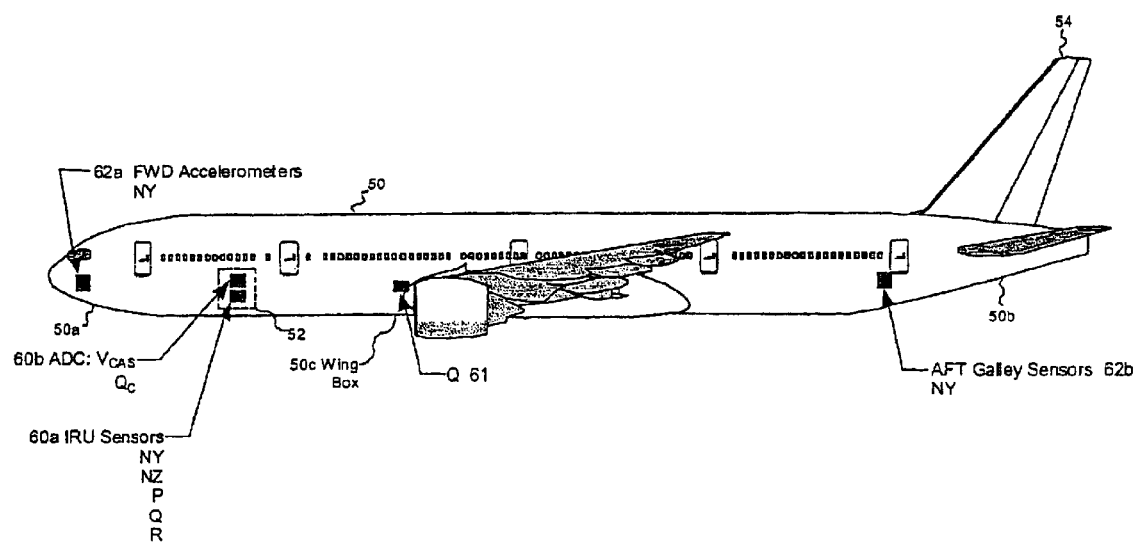
Figure 1   Sensor Locations of preferred embodiment of the present invention

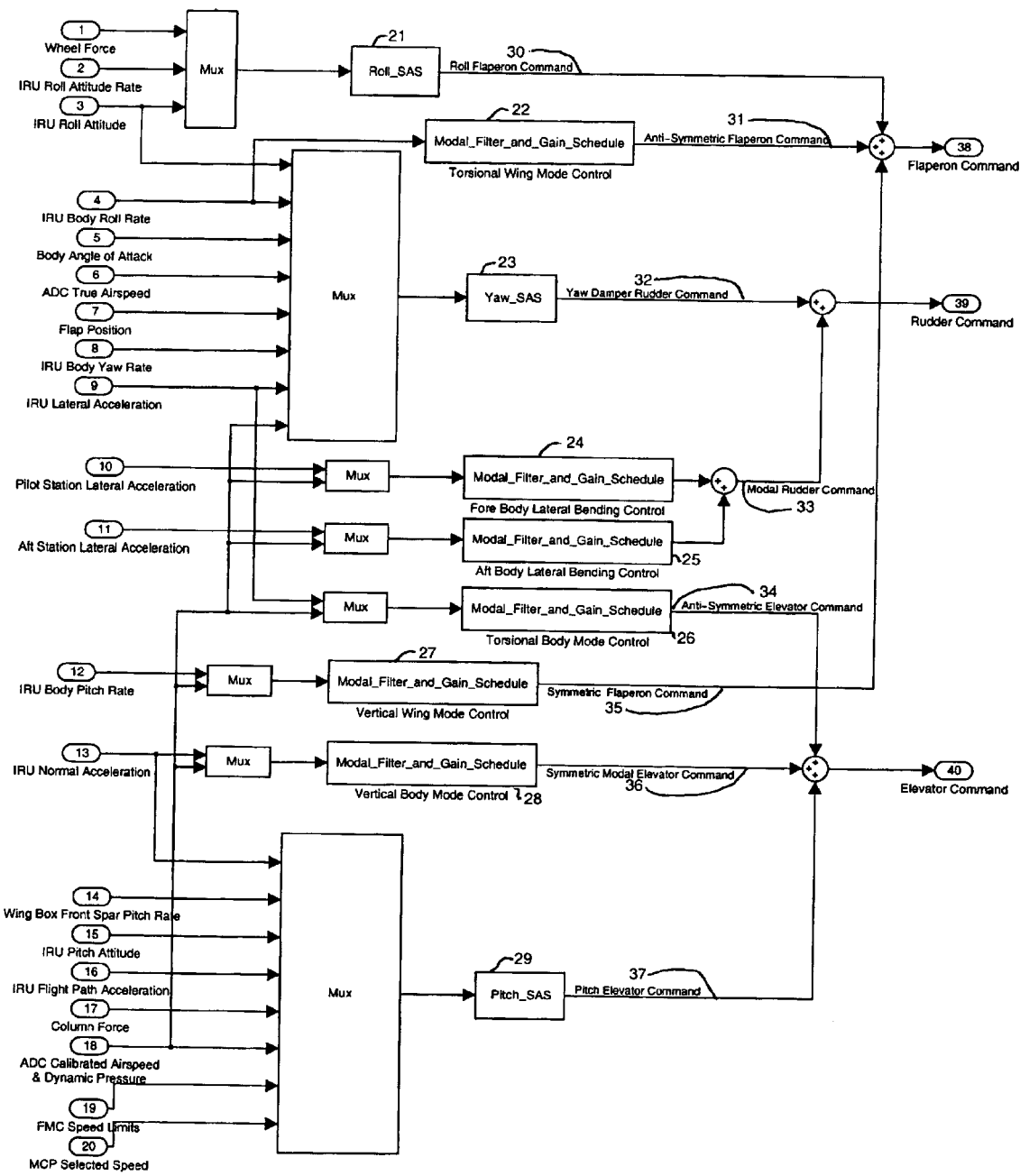
Figure 2: A Preferred Embodiment of a Multi-Axes Modal Suppression System

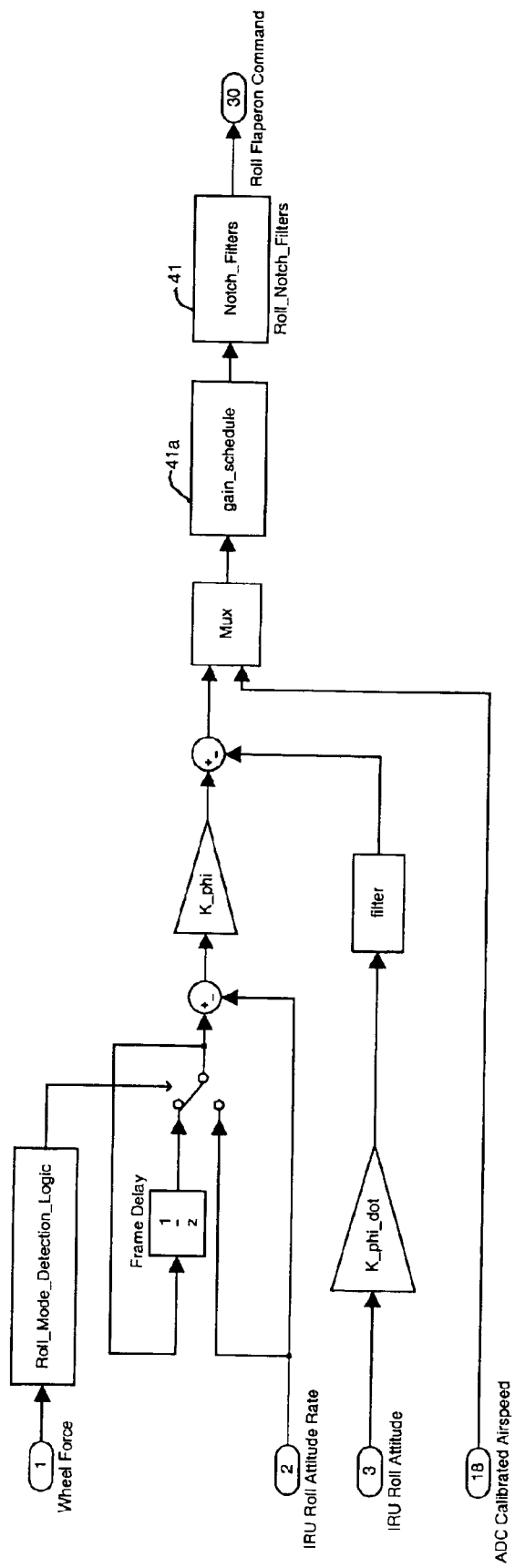
Figure 2a : A Typical Roll Stability Augmentation System

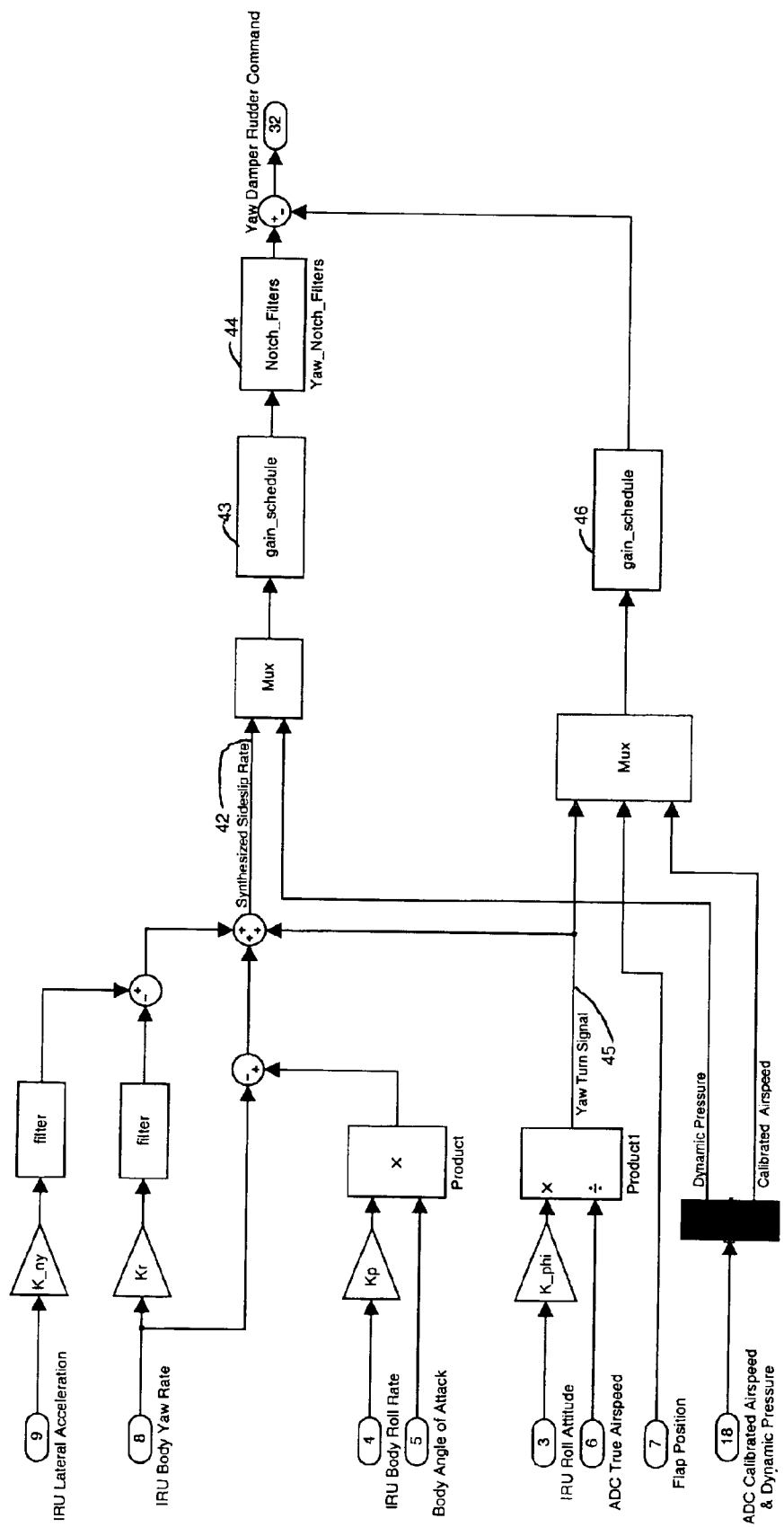
Figure 2b : A Typical Yaw Stability Augmentation System

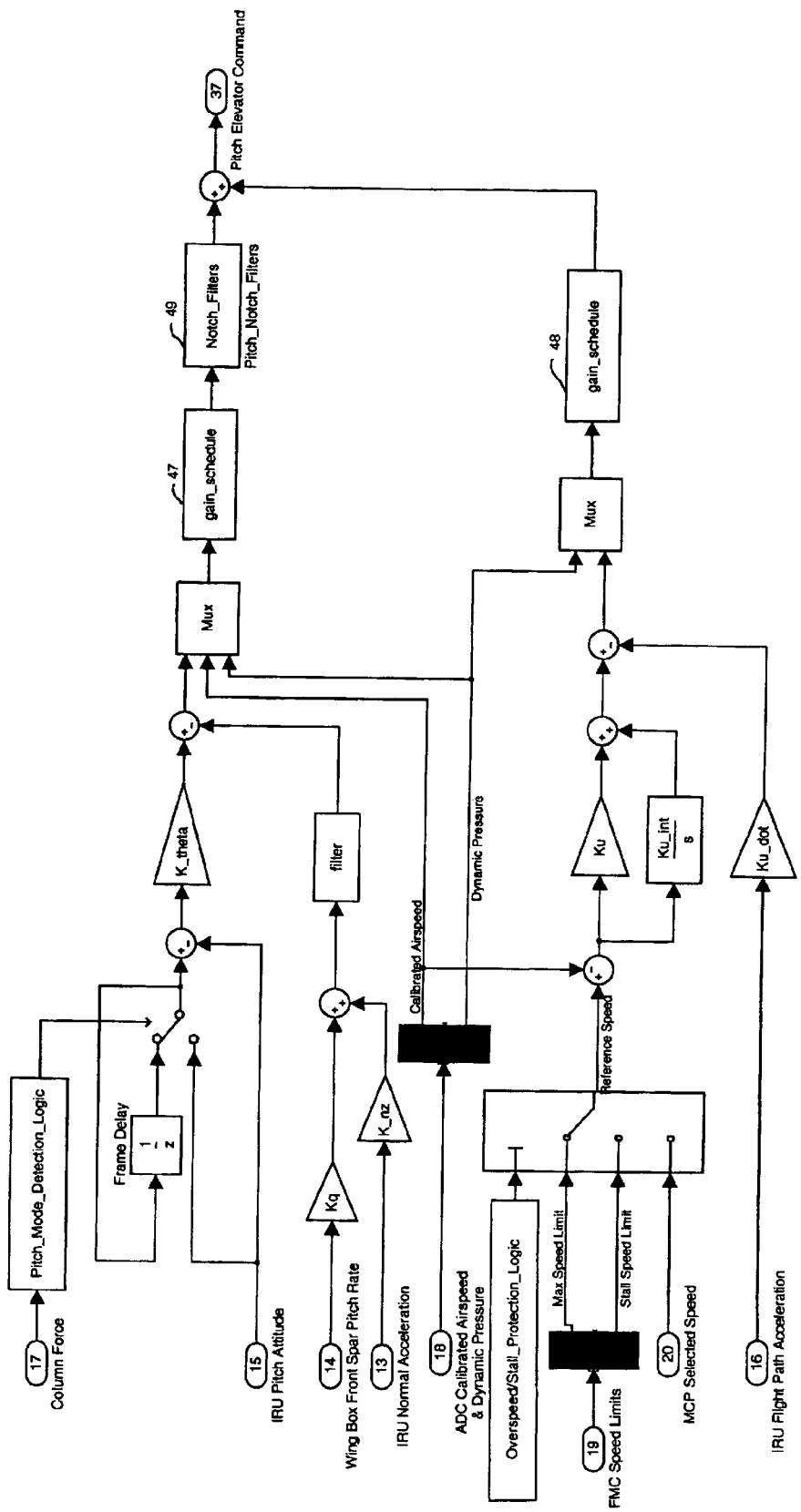
Figure 2c : A Typical Pitch Stability Augmentation System

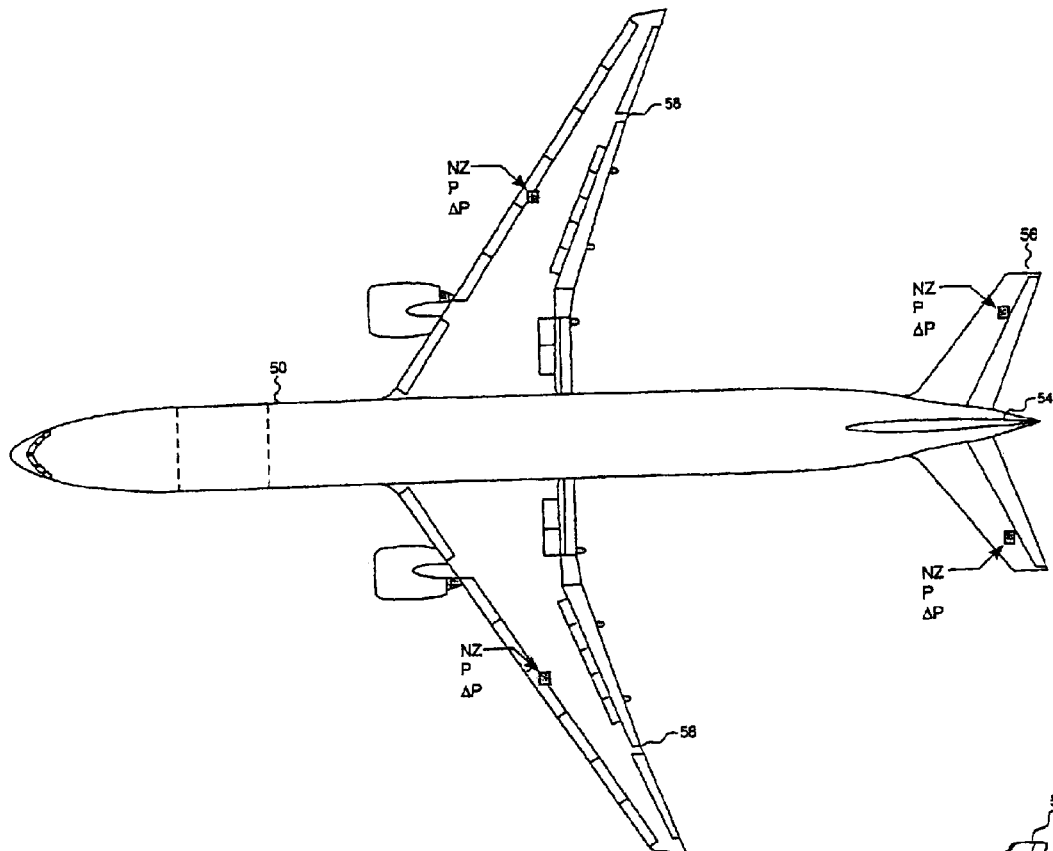
Figure 6b
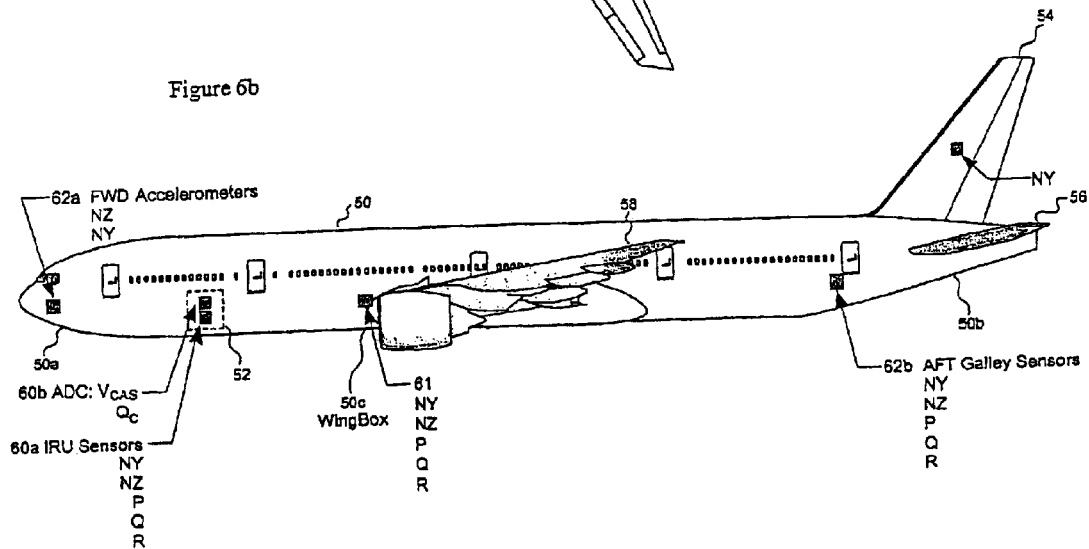
Figure 6a   Possible Sensor Locations of Muti-Axis Modal Suppression System for a conventional configured aircraft (without conard)

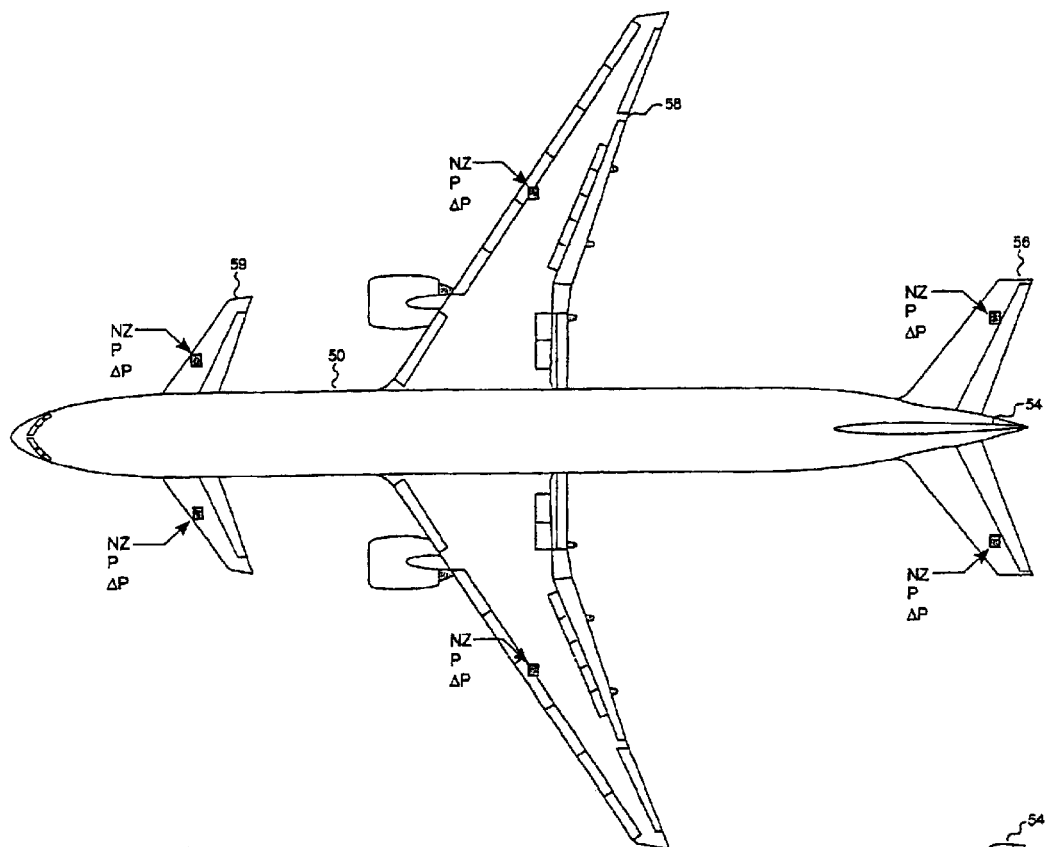
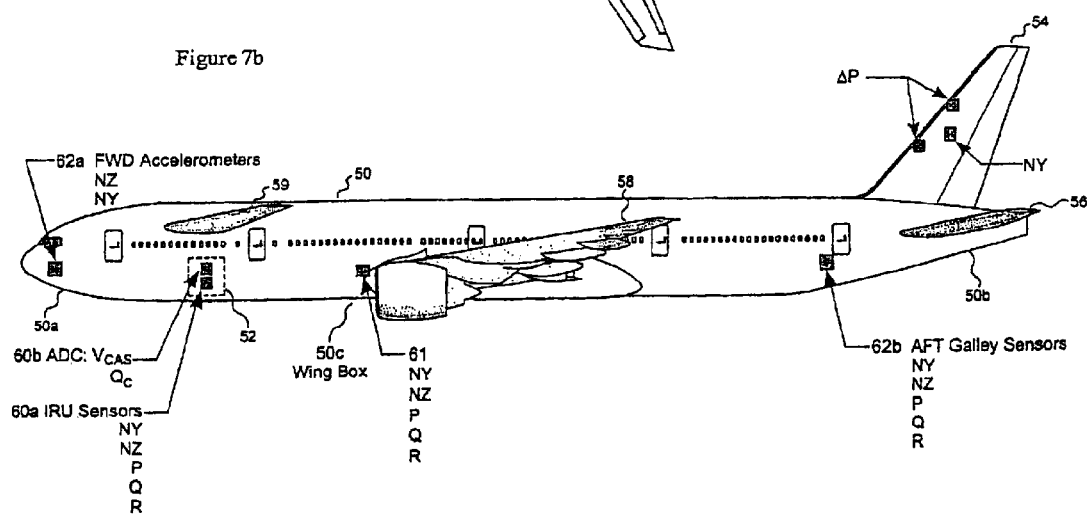
Figure 7a   Possible Sensor Locations of Muti-Axis Modal Suppression System for a non-conventional conard configured aircraft

| Sensed Vibrational Motion / Control Surface Command | Vertical Fuselage / Wing / Empennage | Lateral Bending Fuselage / Wing / Empennage | Torsional Bending Fuselage/ Empennage |
|---|---|---|---|
| Rudder |  | X | X |
| Symmetric Elevator | X |  |  |
| Anti-Symmetric Elevator |  |  | X |
| Canard | X | X | X |
| Symmetric Flaperon | X |  |  |
| Anti-Symmetric Flaperon |  | X | X |

Figure 8

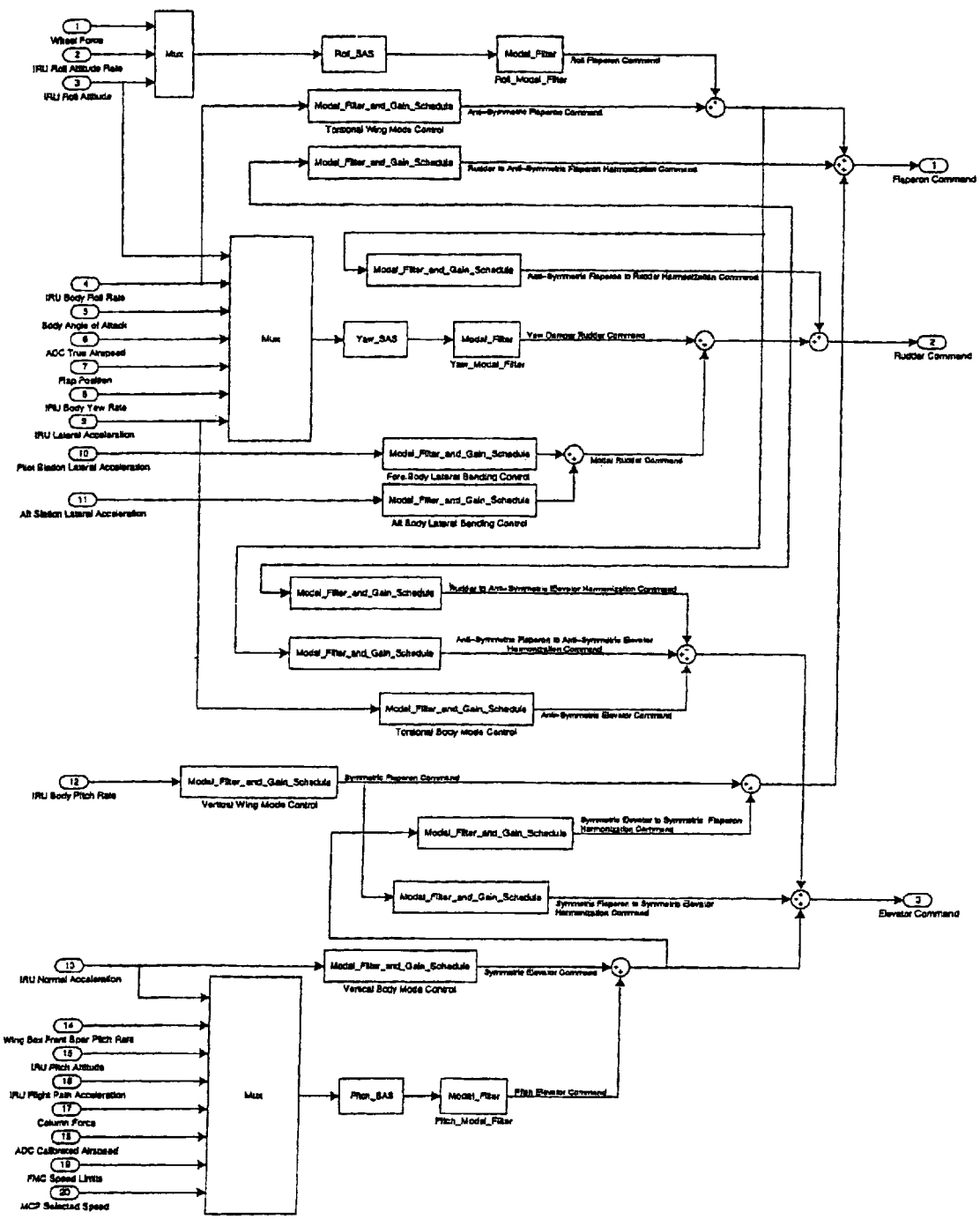
Figure 9 : An Integrated Multi-Axes Modal Suppression System

AIRCRAFT MULTI-AXIS MODAL SUPPRESSION SYSTEM

BACKGROUND OF THE INVENTION

The present invention is directed to the aircraft flight control art and, in particular, to an active control system for suppressing aircraft body vibrations due to natural mode excitations on multiple geometric axis.

Generally speaking, the total motion of an airplane is understood by those in the art, as comprising; 1) rigid body motion and 2) flexible motion. The rigid body of airplane includes translation and rotation about each of the airplane axis. The flexible motion includes vertical bending of fuselage or wings, lateral bending of fuselage or empenage, and torsional motion of fuselage or wings. As airplanes become lighter, larger and longer, the effects of airplane flexibility on passenger comfort and handling quality becomes more critical and attracts higher attention. Large aircraft, particularly those whose fuselage bodies have a high length to diameter ratio, are subject to gust-induced excitation of natural modes of the aircraft body. These modes include natural bending and twisting of the body in the fore and aft sections of the aircraft. These natural mode excitations are objectionable in commercial aircraft since they can result in passenger and crew ride discomfort or increase in structural load. However, in some severe cases, the pilots might misjudge the vibrations as a limit cycle caused by control oscillatory failure and perform unnecessary corrective actions. Further, when the flight deck pilot station has a lot of vibration, the pilot may unintentionally couple with the aircraft's motion, thereby involuntarily putting in control inputs to sustain or amplify the vibrations to higher levels. This phenomenon is known in the art as "Pilot Induced Oscillation" or "Aircraft-Pilot Coupling" or "Aircraft-Pilot Adverse Coupling".

Most modem commercial aircraft flight control systems have either a passive or active modal suppression systems. Passive systems have evolved from the earliest designs and are still used, in the interest of economy and simplicity, and usually when the aircraft's vibration level is low such that a more sophisticated approach is not warranted. These systems were typified by their use of control path notch filters to avoid control signal commands at the aircraft structures—structural mode frequency (natural resonance frequency). However, aircrafts having a more complex structural vibration problem typically require the more sophisticated active systems. These systems sense and process feedback signals from appropriate aircraft body locations and move the control surfaces to generate forces that reduce such vibration levels. Most passive and active modal suppression systems, up until now, reduce structural vibrations in a single geometric axis for its fundamental harmonic mode, first body bending mode for example.

Many prior passive and active systems have addressed a variety of aircraft structural modal suppression problems:

(U.S. Pat. No. 2,718,365 White "Deformation Compensator for Aircraft Controls") A means to increase the effectiveness of the horizontal tail on the longitudinal axis in the presence of fuselage bending;

(U.S. Pat. No. 2,832,551 Gille "Automatic Pilot for Aircraft") A system for damping lateral fuselage accelerations using rudder deflections;

(U.S. Pat. No. 2,985,409 Atwood et al. "Gust Alleviation System") A system for "canceling or diminishing the unpleasant effects on passengers" of gust induced vertical accelerations;

(U.S. Pat. No. 3,079,108 Falkner et al. "Control Apparatus") A system for suppressing aircraft fuselage body bending modes;

(U.S. Pat. No. 3,240,447 Olshausen "Vehicle Control System") A longitudinal gust alleviation system that uses canards to produce compensatory changes in lift without affecting the crafts pitching moment (U.S. Pat. No. 3,241,077 Smyth et al. "Self-Adaptive Control System Eliminating Variable Unwanted Component") A variable notch filter used for decoupling resonant loads from the control system over broad dynamic range;

(U.S. Pat. No. 3,279,725 Andrew et al. "Flight Controller for Flexible Vehicles") Two actuators, mutually arranged for providing pitching moments of opposite sense, to reduce longitudinal body bending in flexible aircraft;

(U.S. Pat. No. 3,347,498 Priestly et al. "Aircraft Structural Stress Alleviators") Wing control surfaces to reduce wing structure fatigue caused by wing root body bending;

(U.S. Pat. No. 3,636,324 Dommasch "Air Data Lateral-Directional Stability Augmentation System") A lateral—directional control system for suppressing lateral axis body bending, that does not use prior inertial sensors.

(U.S. Pat. No. 3,734,432 Low "Suppression of Flutter") An active control system for suppression of flutter that includes controlling the torsional bending of airfoils. Torsion & bending motions and deflections are sensed and converted by a stability control augmentation system into leading and trailing edge control surface deflections in efforts to counteract said motions & deflections.

(U.S. Pat. No. 3,902,686 Wykes et al. "Combined Vertical and Lateral Identical Location of Accelerometer and Force System") Lateral accelerometers and control vanes are used to reduce the lateral and vertical vibration at the pilots station.

(U.S. Pat. No. 4,455,004 Whitaker "Flight Control Device for Airplanes") Wingtip mounted control surfaces provide wing load alleviation during maneuvering & high speed gusts.

(U.S. Pat. No. 4,706,902 Destuynder et al. "Active Method and Installation for the Reduction of Buffeting of the Wings of an Aircraft") Wing buffeting alleviation system that applies to wing mode flutter control.

(U.S. Pat. No. 4,796,192 Lewis "Maneuver Load Alleviation system") Wing load alleviation system that selectively deflects aerodynamic surfaces in response to a real-time structural wing load calculation for the purposes of moving the wing lift vector inboard thereby reducing the moment arm by which it is acting.

(U.S. Pat. No. 4,821,981 Gangsaas et al. "Maneuver Enhancement and Gust Alleviation System) A maneuver enhancement & gust load alleviation system that coordinates the control & effects of multiple aircraft control surfaces that are otherwise adversely coupled.

(U.S. Pat. No. 5,186,416 Fabre et al. "System for Reducing the Forces Applied to the Wings and Particularly to the Root of the Wings of an Aircraft in Flight") Wing load alleviation system that deflects aerodynamic surfaces in response to sensed vertical accelerations for the purposes of reducing wing root bending moments.

(U.S. Pat. No. 5,072,893 Chakravarty et al. "Aircraft Modal Suppression System") An accelerator & rudder based suppression system to damp aft body lateral accelerations after they occur for the purposes of improving ride quality.

(U.S. Pat. No. 5,224,667 Lacabanne "System Enabling the Flutter Behavior of an Aircraft to be Improved") An accelerometer and rudder based control system for suppressing lateral bending modes.

(U.S. Pat. No. 5,375,794 Bleeg "Apparatus and Method for Reducing Aircraft Loads Resulting from Atmospheric Turbulence and Gusts") Pressure sensor & rudder based gust load alleviation system that suppresses weather-vane (beta) rotational modes for the purposes of improving ride quality.

(U.S. Pat. No. 5,452,865 Tran et al. "Aircraft Frequency Adaptive Modal Suppression System") Modal suppression system that uses dynamic fuel parameter to modify modal suppression control law.

(U.S. Pat. No. 5,598,991 Nadkarni et al. "Method and Apparatus for Detecting Oscillatory Phenomena Indicative of Airflow Separation") Flow separation monitor improvement to differential pressure sensor based U.S. Pat. No. 5,375,794.

(U.S. Pat. No. 5,667,166 Tran et al. "Aircraft Frequency Adaptive Modal Suppression System") Modal suppression system that uses gross weight to modify modal suppression control law.

(U.S. Pat. No. 5,669,582 Bryant et al. "Method and Apparatus for Reducing Unwanted Sideways Motion in the Aft Cabin and Roll-Yaw Upsets of an Airplane due to Atmospheric Turbulence and Wind Gusts") Improvements to U.S. Pat. No. 5,375,794.

(U.S. Pat. No. 5,833,173 Tran et al. "Aircraft Frequency Adaptive Modal Suppression System") Improvement to U.S. Pat. No. 5,072,893.

From the foregoing discussion, it is well settled in the art to use filters to suppress structural resonance exciting command inputs. Further, it is settled in the art to sense bending & torsional moments of structures caused by gusts, high maneuvering load factors and structural resonances, and to alleviate these upsets through the use of a stability augmentation computer, usually with sensors and flight control effectors in the vicinity of the upset. Moreover, the prior art has been concerned with applications of axis-symmetric flight control inputs, on a particular control axis to counteract a structural upset on the same axis. However, what is not known, concerns the use of anti-symmetric control inputs on one control axis to counteract the effects of control inputs or structural resonances on another control axis.

For these reasons, there is a need for a comprehensive strategy to address structural modal suppression on multiple geometric axis's. Further, there is a need for a simultaneous multi-axis flight control system apparatus wherein all axis flight controls are utilized to alleviate structural resonances of airfoil, aircraft body bending and torsional moments. Still further, there is a need for an active modal suppression control system that is capable of accurately monitoring aircraft structural vibrations due to excitation of natural aircraft bending and torsional modes, wherein the airplane's control surfaces are moved in such a way as to reduce the flexible motion at the same time controlling the rigid body motion.

BRIEF SUMMARY OF THE INVENTION

The present invention, therefore, is directed to an active aircraft modal suppression system that is capable of accurately sensing modal induced oscillations and producing control signals to deploy control surfaces to suppress such oscillations.

According to the invention, an aircraft multi-axis modal suppression control system suppresses aircraft body deflections due to natural body flexible modes and comprises control surface means which is controllably deployable in response to input control signals. Accelerometers, rate gyros, and/or pressure ports are predeterminedly located on the aircraft body to sense signals that are representative of the predetermined natural modes. In a particular implementation of the invention, the most significant and objectionable body bending modes and the torsional modes are suppressed. Also, conventional means are employed to produce a velocity signal representative of aircraft velocity. The control algorithm is responsive to the pressure ports, sensed accelerations, and/or attitude rates, and the aircraft velocity signal such that the control surfaces are deployed to create forces on the aircraft body to suppress the natural mode induced oscillations at different flight phases.

In a further aspect of the invention, a conventional altitude means produces an altitude signal representative of aircraft altitude and the control algorithm includes means responsive to the altitude signal for producing the control surface control signals.

In yet a further aspect of the invention, the signals produced by the predeterminedly located sensors are processed through frequency sensitive modal filters such that the desired modal control signals are generated at the proper phase to suppress the structural vibrations rather than exciting them.

In the lateral axis, besides the conventional usage of rudder to control the lateral body bending mode, one aspect of this invention is to use anti-symmetric elevator control surface deflections or positions to control body torsional mode.

In yet another aspect of the invention, anti-symmetric flaperon control surface deflections or positions are used to control wing torsional mode and body tortional mode.

In the longitudinal axis, in addition to the usage of symmetric elevator to control the vertical body bending mode, a further aspect of this invention is to use symmetric flaperon control surface deflections or positions to control vertical wing mode.

It is understood by those skilled in the art that a sufficient number of sensors other than what is currently shown in the preferred embodiments can be employed to provide information needed to suppress the structural modes. It is further understood that different control effectors other than what currently shown in these embodiments can also be deployed to provide the necessary modal damping, without departing from the spirit of the present invention. For example, as shown in FIGS. 7a & 7b, a "canard configured" aircraft would utilize canard control surface deflections in conjunction with wing and/or tail control surface deflections, within the scope and teaching of the present invention.

In the preferred embodiment of the present invention, the multi-axis modal suppression control law is implemented wherein the rigid body controls are augmented by a functionally separated novel modal suppression control system. However, in an alternate control system embodiment, the rigid body control are designed in an integrated fashion with the novel modal suppression system herein called the Integrated Multi-Axis Modal Suppression System.

BRIEF DESCRIPTION OF THE SEVERAL VIEWS OF THE DRAWING

FIG. 1 shows a conventional aircraft configuration having an arrangement of input sensors as disposed within an aircraft in accordance with the preferred embodiment of the present invention that includes: inertial reference units, air data computer, accelerometers at the aft and forward body locations, and wing box front spar mounted rate gyro and accelerometers.

FIG. 2 shows a block diagram of the preferred embodiment of the multi-axis modal suppression control law in which the rigid body control laws are integrated functionally independent of the modal suppression system.

FIG. 2a shows the Roll Stability Augmentation Control Algorithm used in accordance with the preferred embodiment of the Multi-Axis Modal Suppression System.

FIG. 2b shows the Yaw Stability Augmentation Control Algorithm used in accordance with the preferred embodiment of the Multi-Axis Modal Suppression System.

FIG. 2c shows the Pitch Stability Augmentation Control Algorithm used in accordance with the preferred embodiment of the Multi-Axis Modal Suppression System.

FIGS. 6a and 6b show multiple view of a conventional aircraft configuration having a arrangement of possible input sensors as disposed within a aircraft: IRU, ADC, rate gyros, and accelerometers at the aft and fwd bodies location, rate gyros & accelerometers at the wing box front spa, and rate gyros, accelerometers at the empenage.

FIGS. 7a & 7b show multiple views of a non-conventional canard configured aircraft having an arrangement of possible input sensors as disposed within an aircraft in accordance with the present invention that includes: inertial reference units, air data computer, accelerometers at the aft and forward body locations, and wing box front spar mounted rate gyro and accelerometers.

FIG. 8 is a table that summarizes the novel control algorithm's transfer function wherein control inputs solutions are suggested for the suppression of lateral, vertical, or torsional modal accelerations or vibrations on all geometric axes.

FIG. 9 is a block diagram of the embodiment of the Integrated Multi-Axis Modal Suppression control law wherein the rigid body control laws are designed in an integrated fashion with the modal suppression system.

DETAILED DESCRIPTION OF THE INVENTION

Figure 3:
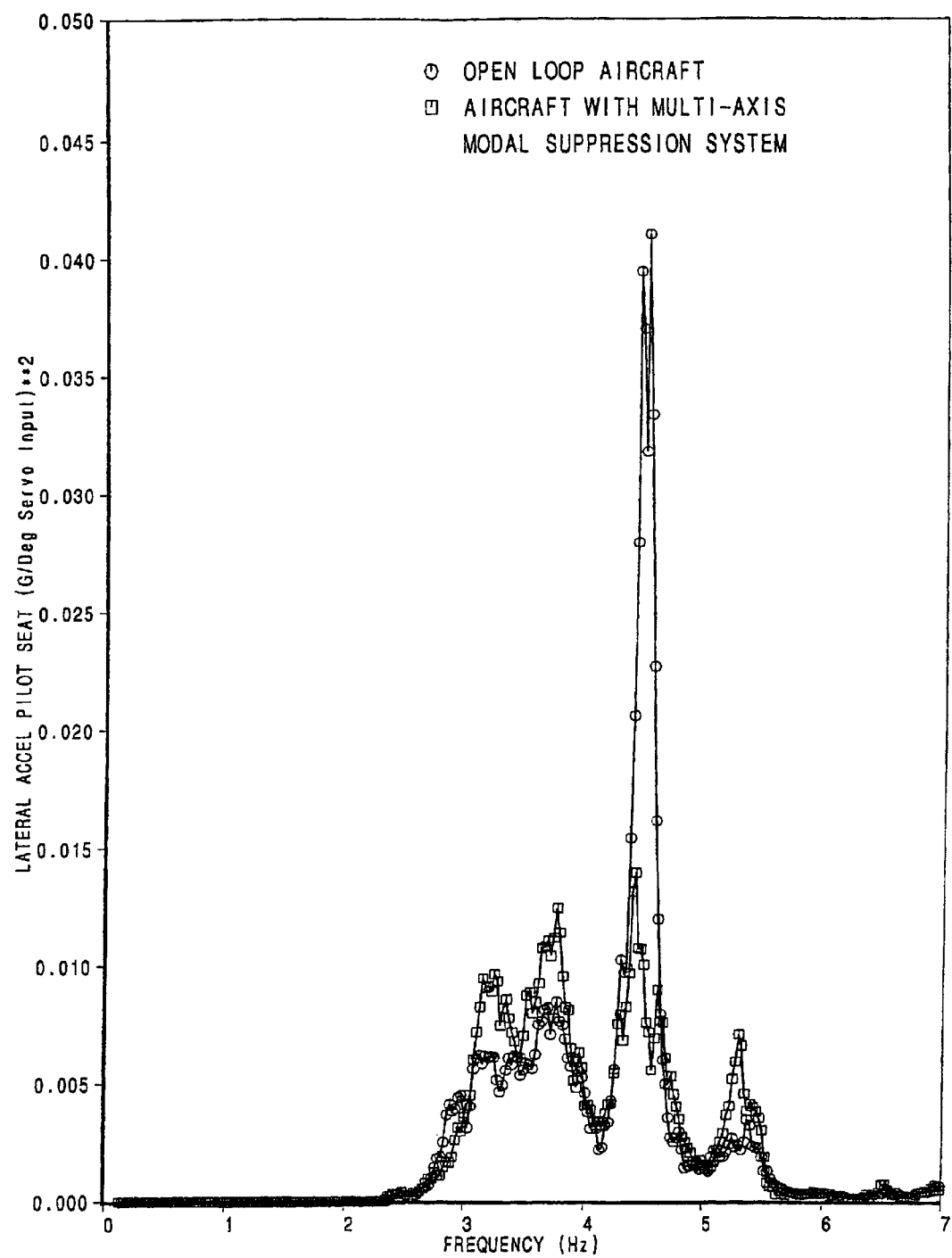
FIG. 3 is a power spectral density graph illustrating the improvement to the torsional vibrational airplane body mode response using when the rudder and anti-symmetric elevator are used as control effectors acting in response to an anti-symmetric elevator servo input excitation source.

FIG. 1 illustrates the side view of a conventional commercial aircraft. The problem exhibited by such aircraft to which the present invention is addressed is that the flexible structure is subject to vibrations resulting from external forces, such as gusts or pilot control inputs, exciting natural resonant modes of the body. Of particular concern due to passenger discomfort are the body bending vibrations and body twisting torsional modes.

The present invention is an active system for suppressing the body bending modes and the torsional modes.

FIG. 1 depicts the sensors required to feed into the control law algorithm of the preferred embodiment of the multi-axis modal suppression system as shown in FIGS. 2, 2a, 2b & 2c. The feedback sensors include an inertial reference unit 60a (hereinafter IRU) located at the Electronics Equipment (hereinafter EE) Bay 52 at the front belly of the aircraft 50; along with the IRU 60a, an air data computer 60b (hereinafter ADC) is also required; a pitch rate gyro 61 located in the vicinity of the wing box front spar 50c is also used in the present invention; finally, dedicated forward accelerometers 62a and aft galley accelerometers 62b at the forward 50a and aft 50b airplane body locations, respectively, are also deployed. In general, the wing box front spar pitch rate gyro 61 and the IRU sensors 60a together provide the attitude and acceleration signals for the rigid body mode stability augmentation. The ADC 60b provides the speed and/or dynamic pressure for control law gain scheduling such that proper amount of surface deflection can be applied at different speed/dynamic pressure conditions even though similar vibration levels are sensed. For modal suppression, the dedicated accelerometers 62a, 62b and the IRU rate gyro and accelerometer sensors usually provide the necessary structural mode contents. It is understood that the location of the EE Bay 52 has been a matter of historical convention wherein all electronics were situated in the vicinity of the flight deck. However, other locations of the EE Bay will not depart from the spirit of this invention. Further, it is also understood that the modern trend towards integrating a multiplicity of systems, such as the integration of the IRU 60a & the ADC 60b into the Air Data Inertial Reference Unit (hereinafter ADIRU) will similarly not depart from the spirit of the present invention.

This feedback sensor embodiment according to the present invention differs from conventional designs with the addition of the pitch rate gyro 61 in the vicinity of the wing box front spar 50c. It has been found, that wing box sensors are preferred and have an advantage over the IRU signals for rigid body controls due to the lack of structural mode contents at the wing box front spar area, thereby reducing any inadvertent coupling of the structural mode excitation. This phenomenon is simply an exploitation of the relatively stiff structures that characterize the wing box vicinity. Although the preferred embodiment of the present invention only utilizes a pitch rate gyro 61 in the vicinity of the wing box front spar location 50c, other dedicated gyros and accelerometers can also be deployed at this location and its vicinities, if necessary, to minimize any rigid body/structural mode couplings.

FIG. 2 depicts the control law algorithm of the present multi-axis modal suppression system preferred embodiment. It contains of a Roll Stability Augmentation System (hereinafter SAS) 21, a Torsional Wing Mode Control Algorithm 22, a Yaw SAS 23, a Fore Body Lateral Bending Control Algorithm 24, an Aft Body Lateral Bending Control Algorithm 25, a Torsional Body Mode Control Algorithm 26, a Vertical Wing Mode Control Algorithm 27, a Vertical Body Bending Mode Control Algorithm 28, and a Pitch SAS 29. Each of these control algorithms will be explained further in the following discussion.

The Roll SAS 21 is shown in FIG. 2a. The Roll SAS uses the IRU roll attitude signal 3 to provide rigid body roll attitude control. Loop damping is provided by IRU roll attitude rate signal 2. Wheel force 1 is used to determine when to activate the roll attitude control. Roll notch filters 41 at different structural mode frequencies are generally used to desensitize the roll flaperon command 30 from exciting any structural modes. The roll flaperon command controls the left and the right flaperons in opposite direction but with the same amplitude. Hereafter, a command that causes the motion of the control surfaces to move in opposite direction but with the same amplitude will be referred to as anti-symmetric command. The ADC calibrated airspeed 18 is used for gain scheduling 41*a*.

The Torsional Wing Mode Control Algorithm 22 uses the IRU body roll rate 4 to provide "wing torsion" structural information so that an anti-symmetric flaperon command 31 may be generated to control this mode. The torsional wing modal suppression filter 22 is designed to provide the proper gain and phase relationship such that anti-symmetric flaperon would be deployed at the right moment with the right amplitude. Calibrated airspeed 18 is used for gain scheduling, It is understood by those skilled in the art that the sensor placement, the use of other sensors, or use of other control effectors may be used, if found to be more efficient, without departing from the spirit of the present invention.

FIG. 2*b* shows the Yaw SAS 23. The primary function of the Yaw SAS 23 is to generate a rudder command for rigid body dutch roll damping and coordinated turn entry/exit, damping and to allow the airplane to sustain a constant steady state turn. The feedback sensors include: IRU body yaw rate 8, IRU body roll rate 4, IRU roll attitude 3, and IRU lateral acceleration 9. In addition, body angle of attack 5 and true airspeed from the ADC 6 are also fedback. These signals form a synthesized sideslip rate signal 42 to provide dutch roll damping and turn entry/exit coordination. Dynamic pressure 18*a* from the ADC is used for gain scheduling 43. The signal is then passed through a series of yaw notch filters 44. Steady state turn coordination guidance, is provided by passing the yaw turn signal 45 through a gain scheduler 46, which in turn is a function of calibrated airspeed 18 and flap position 7. Finally the yaw damper rudder command 32 is produced.

Dedicated accelerometers (62*a*, 62*b*) in FIGS. 6*a* & 7*a* at the pilot station 50*a* and at the aft galley 50*b* are used as the main feedback sensors for the fore and aft lateral body bending control (24, 25)in FIG. 2 respectively. Each sensor passes through its own modal suppression algorithms, the Fore Body Lateral Control Algorithm 24 and the Aft Body Lateral Control Algorithm 25 respectively, before they are summed to form a modal rudder command 33. Again, calibrated airspeed 18 is used for gain scheduling.

The Torsional Body Mode Control Algorithm 26 uses the IRU lateral acceleration 9 to provide "body torsion" structural information so that an anti-symmetric elevator command 34 may be generated to control this mode. The torsional body modal suppression filter 26 is designed to provide the proper gain and phase relationship such that anti-symmetric elevator would be deployed at the right moment with the right amplitude. Calibrated airspeed 18 is used for gain scheduling.

The Vertical Wing Mode Control Algorithm 27 uses the IRU body pitch rate 12 to provide "symmetric wing bending" structural information so that a symmetric flaperon command 35 may be generated to control this mode. The vertical wing modal suppression filter 27 is designed to provide the proper gain and phase relationship such that symmetric flaperon would be deployed at the right moment with the right amplitude. Calibrated airspeed 18 is used for gain scheduling.

The Vertical Body Mode Control Algorithm uses the IRU normal acceleration 13 to provide "fore body vertical bending" structural information so that a symmetric elevator command 36 may be generated to control this mode. The vertical body modal suppression filter 28 is designed to provide the proper gain and phase relationship such that symmetric elevator would be deployed at the right moment with the right amplitude. Calibrated airspeed 18 is used for gain scheduling.

FIG. 2*c* shows the Pitch SAS 29. The Pitch SAS is a full time augmentation system that provides rigid body pitch axis stability for aircraft control systems that have been built with relaxed-static stability. In addition to pitch damping, the system also can provide C* controls, pitch attitude control, stall and overspeed protection, and long term speed control. The wingbox front spa pitch rate sensor 14 located in the vicinity of the wing box front spar 50*c* (FIGS. 6*a* & 7*a*) is used instead of IRU body pitch rate 12 (FIG. 2), to minimize structural coupling. IRU normal accelerometer 13, IRU pitch attitude 15, IRU flight path acceleration 16, Flight Management Control System speed limits 19, and Autopilot Mode Control Panel selected speed 20 are also used as feedback sensors. Column Force 17 is used to determine when to activate pitch attitude control. Pitch notch filters 49 at different structural mode frequencies are used to desensitize the pitch elevator command 37 from exciting any structural modes. The ADC dynamic pressure 18*a* & calibrated airspeed 18 are also used for gain scheduling 47 & 48

The roll flaperon command 30 in FIG. 2 is then summed with the anti-symmetric flaperon command 31 and the symmetric flaperon command 35 to form the flaperon command 38.

The yaw damper rudder command 32 is then summed with the modal rudder command 33 to form the rudder command 39.

The anti-symmetric elevator command 34 is then summed with the symmetric elevator command 36 and the pitch elevator command 37 to form the elevator command 40.

Figure 4:
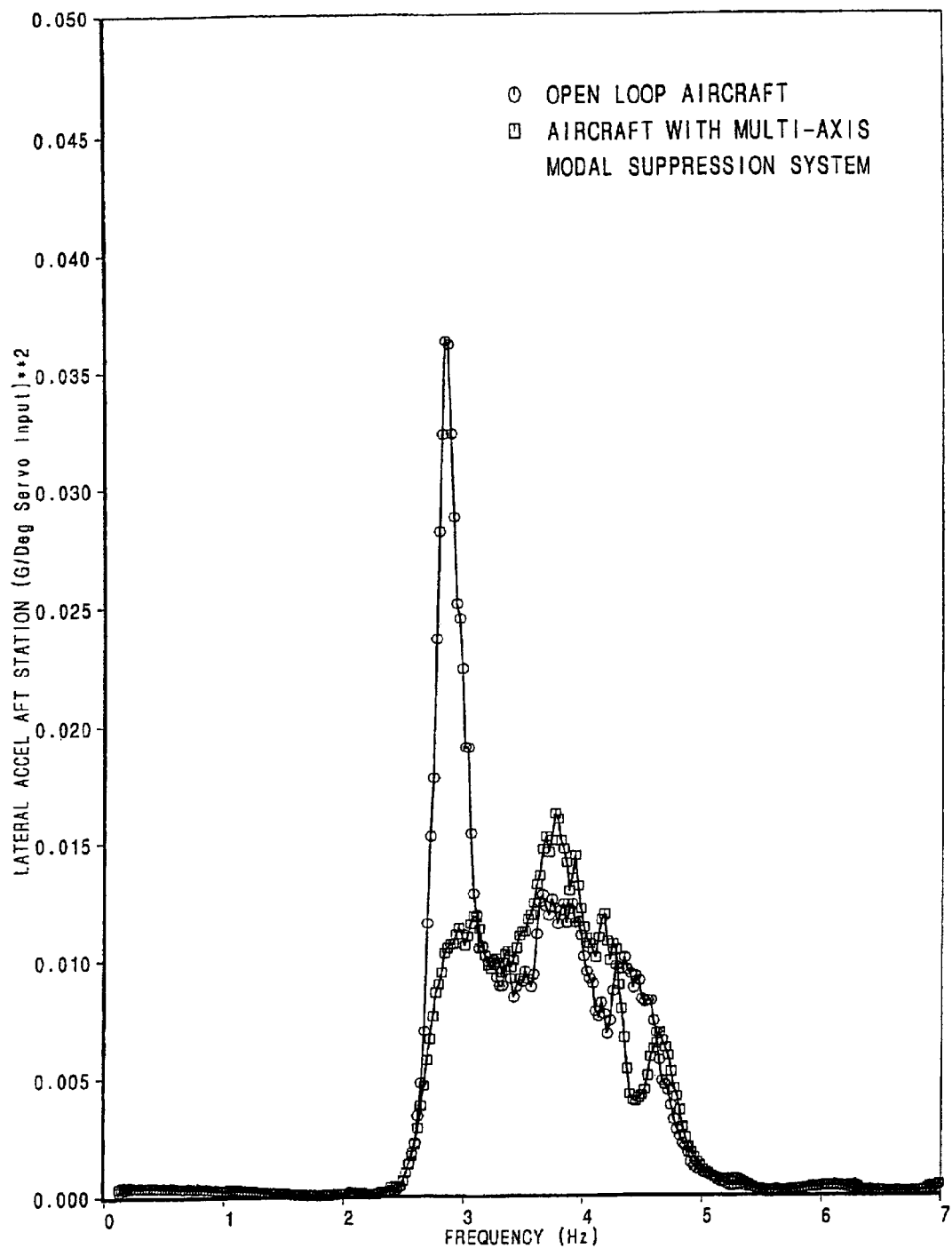
FIG. 4 is a power spectral density graph illustrating the improvement to the lateral body bending mode response when the rudder and anti-symmetric elevator are used as control effectors acting in response to a rudder servo input excitation source.
Figure 5:
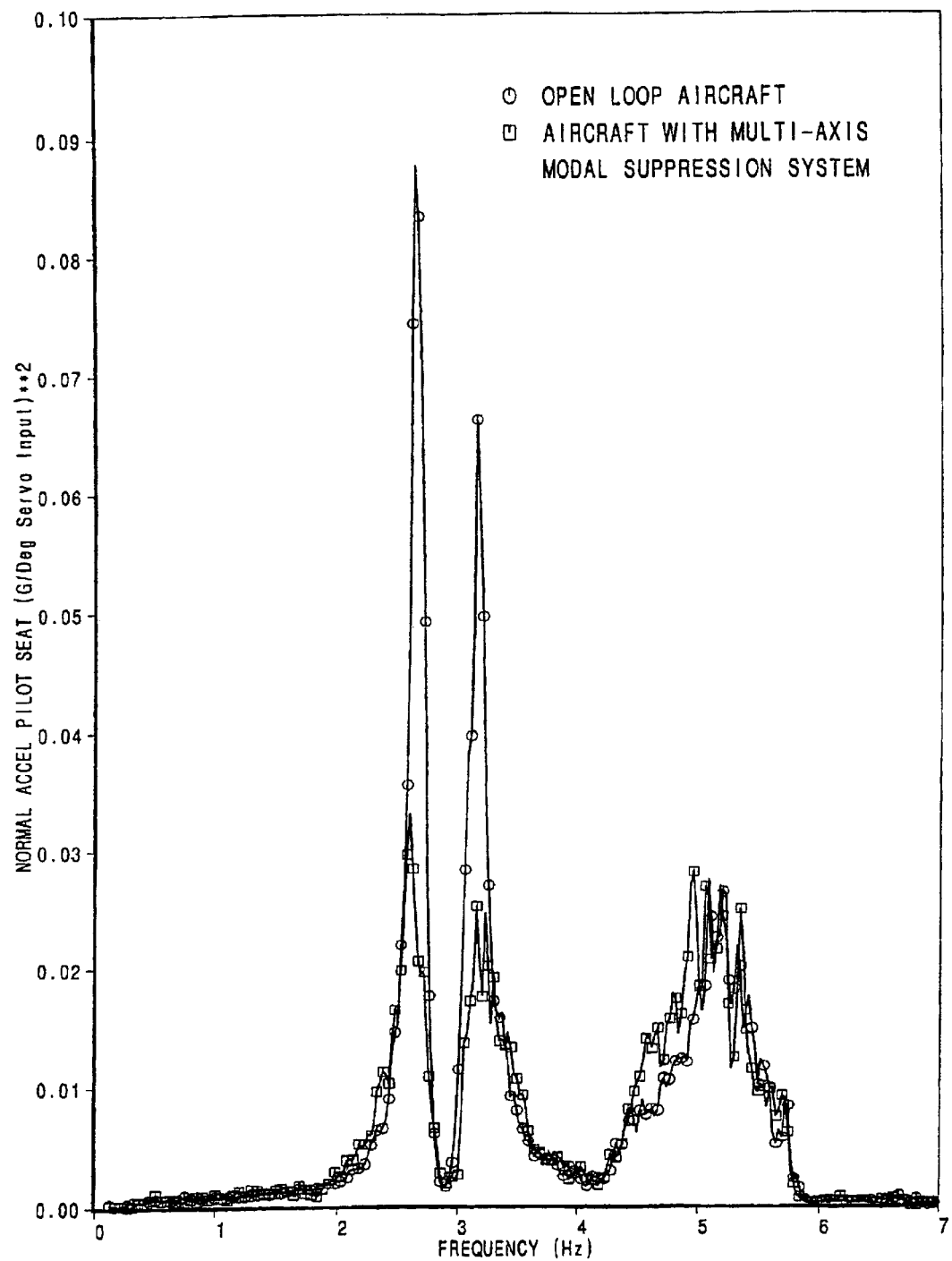
FIG. 5 is a power spectral density graph illustrating the improvement to the vertical body bending mode response when symmetric elevators are used as the main control effectors acting in response to a symmetric elevator servo input excitation source.

FIGS. 3, 4 and 5 show the Power Spectral Density plots of various modes recorded by different sensors to demonstrate the effectiveness of the present invention.

FIG. 3 illustrates the improvement to the torsional airplane body mode response when the rudder and anti-symmetric elevator are used as control effectors acting in response to an anti-symmetric elevator servo input excitation source.

FIG. 4 illustrates the improvement to the lateral body bending mode response when the rudder and anti-symmetric elevator are used as control effectors acting in response to a rudder servo input excitation source.

FIG. 5 illustrates the improvement to the vertical body bending mode response when symmetric elevators are used as the main control effectors acting in response to a symmetric elevator servo input excitation source.

FIGS. 6*a* and 6*b* show multiple views of a conventional aircraft with possible sensor locations to be used in a multi-axis modal suppression system. It shall be understood that not all the sensors presented in the figures are necessary but rather to show a variety of sensors that can be used for the design. For example, if desired to have less coupling with the structural modes, the rigid body stability augmentation system could utilize more of the sensors located at the wing box rather than those from the ADIRU. Similarly, pressure port may be favor for controlling structural mode over accelerometers or gyros.

FIGS. 7*a* and 7*b* show multiple views of a non-conventional canard configured aircraft with possible sensor locations to be used in a multi-axis modal suppression system. Sensors can be installed on the canard surfaces if found to be more advantageous.

The preferred multi-axis modal suppression system shown in FIG. 2 uses a dedicated control effector for each particular structural mode. However, as demonstrated in FIGS. 3 through 5, any one control surface can control, and hence excite, different structural modes. FIG. 8 shows a table that summarizes the type of vibrational motion and an appropriate control surface application to suppress thereof.

FIG. 8 provides a summary of vibrational mode problems and control input solutions in accordance with the systematic method and apparatus of the present invention. The table illustrates that any given control surface can affect more than one type of vibrational motion. Furthermore, it is understood that each type of vibrational mode includes many modes of vibration, known in the art as harmonics, and that control surfaces are chosen to control these various modes as well. Ideally, it is desired to have just one control surface to control all the structural modes, nevertheless it is known to those skilled in the art that this design approach is hard to achieve and hence usually require the use of multiple control surfaces to control the different structural modes. For example, the rudder surface may be selected to provide damping for the lateral body bending mode and also the torsional body-bending mode, while the torsional wing mode is left for the anti-symmetric flaperon to control. The appropriate selection of modes to be damped by each surface is determined by engineering judgment and optimized use of the surface determined by the effectiveness of the surface on the particular mode and the robustness of the resultant control law. Ideally, the design choice will depend on a parametric analysis of both technical and economic data. A technical concern may consider whether any surfaces may be working against other surfaces, a phenomenon known in the art as "adverse coupling". Another technical concern is whether the use of particular surfaces to solve vibrational problems may use up reserve control authority, a phenomenon known as "control saturation". Economic considerations may mitigate against a particular surface utilization in consideration of maintenance impacts and part life cycle reduction.

It is known that one control surface can be used to remove undesirable effect of another control surfaces. For example, if the rudder is used to damp the lateral bending mode at a particular frequency, however its dedicated sensors at times could also pick up signals of other structural modes at other frequencies. As a result, the motion of the rudder may further exasperate the existing torsional body mode. In this case, anti symmetric elevator may be commended to generate at the appropriate frequency to negate the torsional effect of the rudder. Similarly, one may choose the anti-symmetric flaperon to negate the torsional effect of rudder. To provide such a cross-feed, it is understood in the art that appropriate filtering design is required. This approach is known in the art as control harmonization. Thus there is a need to design a modal suppression system in an integrated way such that when the modal command of one control axis is controlling its principal structural mode, the present modal command is cross-fed to the other control axis to make sure its effect on other structural modes could be negated by the inputs of the other control surfaces.

FIG. 9 depicts an Integrated Multi-Axis Modal Suppression System wherein the rigid body controls are designed in an integrated fashion with the novel modal suppression system, as distinguished from the preferred embodiment of the present invention's functionally separated, "augmented" approach.

Control law sensor inputs for this integrated modal suppression system is similar to the preferred embodiment of the Multi-Axis Modal Suppression System. They include: vertical acceleration; lateral acceleration; attitude; altitude rate and acceleration; and pressure distribution on the surfaces. These sensors are distributed along the body of the airplane or on the control surfaces. It is understood that altitude and altitude rate; air data; airplane weight and inertia are used by designers to provide appropriate gain scheduling.

The Roll, Yaw and Pitch Stability Augmentation Systems (for rigid body mode enhancement) of the preferred embodiment of multi-axis modal suppression system, as shown in FIG. 2, are designed independent of the modal suppression system. They are generally supplemented with structural notch filters to minimize any structural couplings. However, today's computer-aid design environment when powerful software programs can design multiple loop control algorithm simultaneously. Some designers may choose This Integrated Multi-Axis Modal Suppression System design is to design both the rigid body stability augmentation control laws and the modal suppression systems in an integrated fashion such that the stability augmentation commands, besides controlling the rigid body modes, may also be allowed to pass through some structural mode frequencies to assist in damping out the corresponding structural modes. One advantage of this particular approach is that it may not be necessary to include any notch filters in its stability augmentation control laws. This concept is demonstrated in FIG. 9 with the modal filters shown adjacent to each of the stability augmentation system.

What is claimed is:

1. A system for controlling deformation of an aircraft during flight, comprising:
   a receiver coupled to at least one aircraft sensor to receive an input indicative of excitation of a torsional mode of a body of an aircraft about a longitudinal axis of the aircraft during flight; and
   a processor coupled to the receiver, the processor being further coupled to a first elevator surface on a first side of the longitudinal axis and a second elevator surface on a second side of the longitudinal axis, the processor being configured to:
      direct a first output signal to the first elevator surface to deflect the first elevator surface in a first direction;
      simultaneously direct a second output signal to the second elevator surface to deflect the second elevator surface in a second direction opposite the first direction to actively counter excitation of the torsional mode of the body of the aircraft; and
      while actively countering excitation of the torsional mode of the body of the aircraft, direct a third output signal to the first and second elevator surfaces to move the first and second elevator surfaces in the same direction to control a pitch attitude of the aircraft.

2. The system of claim 1, further comprising the aircraft.

3. The system of claim 1 wherein the processor is configured to direct the first and second elevator surfaces to move at a first frequency to at least partially counter the force applied to the aircraft and simultaneously control a flight attitude of the aircraft by directing the first and second elevator surfaces to move at a second frequency less than the first frequency, with the first and second frequencies of motion superimposed.

4. A system for controlling deformation of an aircraft during flight, comprising:

a receiver coupled to at least one aircraft sensor to receive an input indicative of excitation of a torsional mode of a body of an aircraft about a longitudinal axis of the aircraft during flight; and a processor coupled to the receiver, the processor being further coupled to a first control surface on a first side of the longitudinal axis and a second control surface on a second side of the longitudinal axis, the processor being configured to:

direct a first output signal to the first control surface to deflect the first control surface in a first direction;

simultaneously direct a second output signal to the second control surface to deflect the second control surface in a second direction opposite the first direction to actively counter the excitation of the torsional mode of the body of the aircraft; and while actively countering the excitation of the torsional mode of the body of the aircraft, direct a third output signal to the first and second control surfaces to move the first and second control surfaces in the same direction.

5. The system of claim 4 wherein the processor is configured to direct the first and second control surfaces to move at a first frequency to at least partially excitation of the torsional mode of the body of the aircraft and simultaneously control a flight attitude of the aircraft by directing the first and second control surfaces to move at a second frequency less than the first frequency, with the first and second frequencies of motion superimposed.

6. The system of claim 4 wherein the first control surface includes a first elevator on a first side of a longitudinal axis of the aircraft, and wherein the second control surface includes a second elevator on a second side of the longitudinal axis of the aircraft.

7. The system of claim 4, wherein the at least one sensor includes a pitch rate sensor positioned at least proximate to a wing body junction of the aircraft.

8. The system of claim 4, wherein the at least one sensor includes a pitch rate sensor positioned at a forward spar of a wing box of the aircraft.

9. A system for controlling deformation of an aircraft during flight, comprising:

a receiver configured to receive an input corresponding to at least one force applied to an aircraft during flight;

a processor coupled to the receiver and to right and left elevators of the aircraft, the processor being configured to:

direct the left and right elevator surfaces to move symmetrically to control a pitch attitude of the aircraft;

simultaneously direct the left and right elevators to move symmetrically to actively control bending of a fuselage of the aircraft; and simultaneously direct the left and right elevators to move antisymmetrically actively to control torsion of the fuselage of the aircraft.

10. The system of claim 9, further comprising the aircraft.

11. The system of claim 9, further comprising at least one sensor coupled to the receiver to transmit the input.

* * * * *

UNITED STATES PATENT AND TRADEMARK OFFICE
CERTIFICATE OF CORRECTION

PATENT NO. : 6,915,989 B2
DATED : July 12, 2005
INVENTOR(S) : Kiourmars Najmabadi et al.

It is certified that error appears in the above-identified patent and that said Letters Patent is hereby corrected as shown below:

Column 1,
Line 36, "modem" should be -- modern --.

Signed and Sealed this

Fourth Day of October, 2005

JON W. DUDAS
*Director of the United States Patent and Trademark Office*